United States Patent
Teng et al.

(10) Patent No.: US 7,252,427 B2
(45) Date of Patent: Aug. 7, 2007

(54) LIGHT GUIDE PLATE HAVING V-CUT GROOVES AND A LIQUID CRYSTAL DISPLAY USING THE SAME

(75) Inventors: Ching-Hung Teng, Miao-Li (TW); Chiu-Lien Yang, Miao-Li (TW); Jia-Pang Pang, Miao-Li (TW)

(73) Assignee: Innolux Display Corp., Maio-Li (TW)

( * ) Notice: Subject to any disclaimer, the term of this patent is extended or adjusted under 35 U.S.C. 154(b) by 0 days.

(21) Appl. No.: 11/157,887

(22) Filed: Jun. 20, 2005

(65) Prior Publication Data

US 2005/0281052 A1 Dec. 22, 2005

(30) Foreign Application Priority Data

Jun. 18, 2004 (TW) .............................. 93117706 A

(51) Int. Cl.
*F21V 7/04* (2006.01)
(52) U.S. Cl. ...................................... 362/626; 362/339
(58) Field of Classification Search ................ 362/362, 362/625, 623, 610, 612, 620, 330, 339, 326, 362/626
See application file for complete search history.

(56) References Cited

U.S. PATENT DOCUMENTS

| | | | | |
|---|---|---|---|---|
| 5,054,885 A | * | 10/1991 | Melby | 359/618 |
| 6,074,069 A | * | 6/2000 | Chao-Ching et al. | 362/26 |
| 6,669,350 B2 | | 12/2003 | Yamashita et al. | |
| 2004/0012945 A1 | * | 1/2004 | Yamashita et al. | 362/31 |
| 2004/0130879 A1 | * | 7/2004 | Choi et al. | 362/31 |
| 2006/0203467 A1 | * | 9/2006 | Tseng | 362/30 |

* cited by examiner

*Primary Examiner*—Thomas M. Sember
*Assistant Examiner*—Julie A. Shallenberger
(74) *Attorney, Agent, or Firm*—Wei Te Chung

(57) ABSTRACT

A light guide plate (10) includes a bottom surface (11), a light incident surface (12) adjacent to the bottom surface, a light emitting surface (13) opposite to the bottom surface, and a plurality of V-shaped grooves adjacent to the bottom surface, each of the V-shaped grooves defining two bottom angles ($\alpha$, $\beta$) and a top line (101), the bottom angles being different. The top line of each V-shaped groove is configured so as to maximize the areas of the interfaces of the V-shaped groove, having regard to the top lines of all the V-shaped grooves also being configured to provide a desired distribution of intensity of light beams that emit from the emitting surface in a desired direction. For example, the configurations of the top lines can be such that a maximum luminance of the light guide plate is at a center region of the light emission surface.

17 Claims, 4 Drawing Sheets

LIGHT GUIDE PLATE HAVING V-CUT GROOVES AND A LIQUID CRYSTAL DISPLAY USING THE SAME

BACKGROUND OF THE INVENTION

1. Field of the Invention

The present invention relates to a light guide plate having V-shaped grooves and a backlight module using the same, the backlight module being typically applied in a liquid crystal display (LCD).

2. General Background

An LCD device has the advantages of portability, low power consumption, and low radiation, and has been widely used in various portable information products such as notebooks, personal digital assistants (PDAs), video cameras and the like. Furthermore, the LCD device is considered by many to have the potential to completely replace CRT (cathode ray tube) monitors and televisions.

A typical backlight module used in an LCD primarily includes a light source, a light guide plate, a prism sheet, and primary and secondary diffusers. The light guide plate is an important unit of the backlight module, for converting light emitting from the light source into substantially planar light. The evenness and intensity of luminance of the light guide plate are the most important optical characteristics influencing the performance of the LCD.

FIG. 9 is a schematic, side view of a typical light guide plate 90. The light guide plate 90 includes a bottom surface 91 having a plurality of V-shaped grooves 900, and a light emission surface 93. The V-shaped grooves 900 are parallel to each other, and a pitch between adjacent V-shaped grooves 900 is uniform. The heights of the V-shaped grooves 900 are the same.

FIG. 10 is a schematic, exploded side view of a backlight module using the light guide plate 90. The backlight module includes, in sequence, a first diffuser 95, a set of prism sheets 94, a second diffuser 97, the light guide plate 90, a plurality of light sources 99, and a reflector plate 96. Light beams emitting from the light source 99 enter the light guide plate 90 through the incident surface 92 in different directions. Thus, light beams reaching the V-shaped grooves 900 propagate therefrom in different directions. Some of the light beams reaching each V-shaped groove 900 are incident at the interface thereof at angles greater than a critical angle, and are reflected and then emit from the light emission surface 93. Other light beams reaching each V-shaped groove 900 are incident at the interface thereof at angles less than the critical angle, are refracted and emit from the bottom surface 91, and are then reflected by the reflector plate 96 back into the light guide plate 90. Because the V-shaped grooves 900 disposed on the light guide plate 90 have the same configuration, it is difficult to control the angles of incidence of light beams at all the interfaces such that as many light beams as possible are reflected at the interfaces. In particular, it is difficult to obtain maximum luminance of the light guide plate 90 at a center of the light emission surface 93. Thus the prism sheets 94 are generally a necessary part of the backlight module.

It is desired to provide an improved light guide plate and a backlight using the same which can overcome the above-described deficiencies including the need for prism sheets.

SUMMARY

In one embodiment, a light guide plate includes a bottom surface, a light incident surface adjacent to the bottom surface, a light emitting surface opposite to the bottom surface, and a plurality of V-shaped grooves adjacent to the bottom surface. Each of the V-shaped grooves defines two bottom angles and a top line, the bottom angles being different.

The top line of each V-shaped groove is configured so as to maximize the areas of the interfaces of the V-shaped groove, having regard to the top lines of all the V-shaped grooves also being configured to provide a desired distribution of intensity of light beams that emit from the emitting surface in a desired direction.

Other advantages and novel features will become more apparent from the following detailed description when taken in conjunction with the accompanying drawings, in which:

DETAILED DESCRIPTION OF THE PRESENT INVENTION

Reference will now be made to the drawings to describe the present invention in detail.

Figure 1:
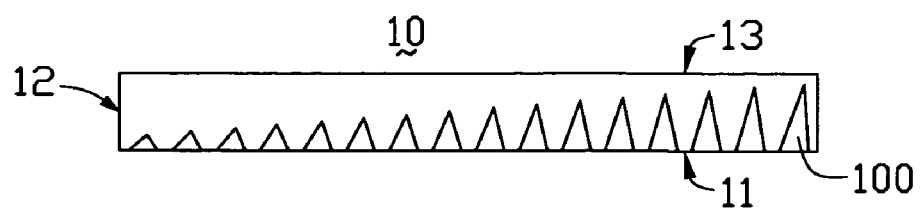
FIG. 1 is a schematic, simplified side view of a light guide plate according to a first embodiment of the present invention, showing ends of a plurality of V-shaped grooves thereof.
Figure 2:
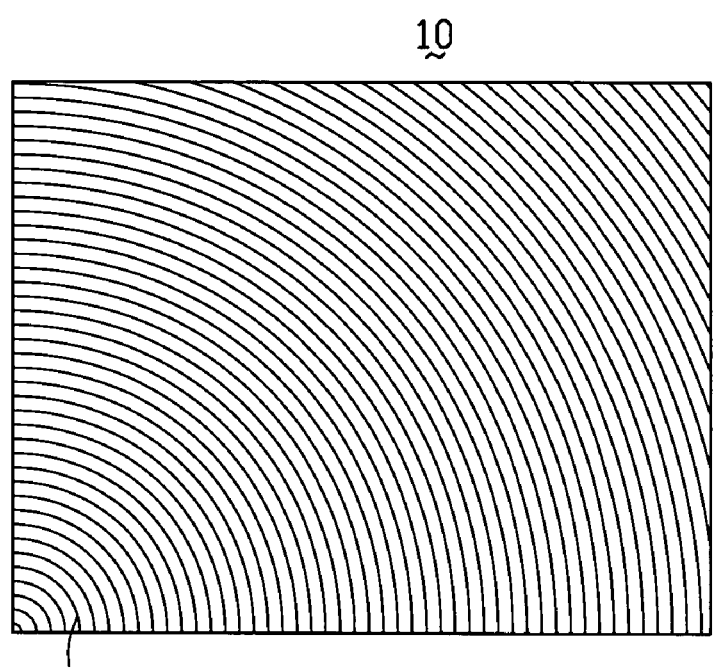
FIG. 2 is a bottom view of the light guide plate of FIG. 1, showing the V-shaped grooves being arcuate.
Figure 3:
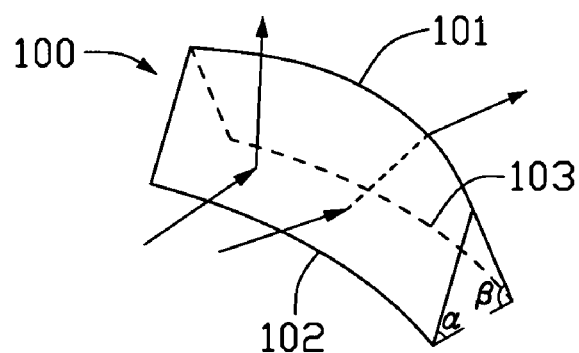
FIG. 3 is an enlarged, isometric view of part of one of the V-shaped grooves of the light guide plate of FIG. 1.

FIG. 1 is a schematic, simplified side view of a light guide plate according to a first embodiment of the present invention. The light guide plate 10 includes a bottom surface 11, a light incident surface 12 connected to the bottom surface 11 at a corner portion of the light guide plate 10, and a light emitting surface 13 opposite to the bottom surface 11. Referring also to FIG. 2 and FIG. 3, a plurality parallel of V-shaped grooves 100 is defined at the bottom surface 11. In the first embodiment, the V-shaped grooves 100 are arcuate, and are concentric relative to a reference point located adjacent a corner of the light guide plate. Heights of the V-shaped grooves 100 become progressively greater along a direction away from the incident surface 12. Each V-shaped grooves 100 defines two bottom lines 102, 103, two bottom angles $\alpha$, $\beta$, and a top line 101. Preferably, the bottom angles $\alpha$, $\beta$ are different.

The top lines 101 of the V-shaped groove 100 are curved lines having a same curvature. The two bottom lines 102, 103 are also curved, and have the same curvature. The bottom angle $\alpha$ of each V-shaped groove 100 is configured such that most of light beams propagating from the incident surface 12 that reach the V-shaped groove 100 are incident at the interface of the V-shaped groove 100 at an angle that is larger than a critical angle. Such light beams are therefore totally internally reflected, and emit from the emitting surface 13 in a desired direction. In similar fashion, the bottom angle β of each V-shaped groove 100 is configured such that most of internally reflected light beams that reach the V-shaped groove 100 are incident at the interface of the V-shaped groove 100 at an angle whereby they are totally internally reflected and then emit from the emitting surface 13 in a desired direction.

The top line 101 of each V-shaped groove 100 is configured so as to maximize the areas of the interfaces of the V-shaped groove 100, having regard to the top lines 101 of all the V-shaped grooves 100 also being configured to provide a desired distribution of intensity of light beams that emit from the emitting surface 13 in a desired direction. For example, the configurations of the top lines 101 can be such that a maximum luminance of the light guide plate 10 is at a center region of the light emission surface 13.

Figure 4:
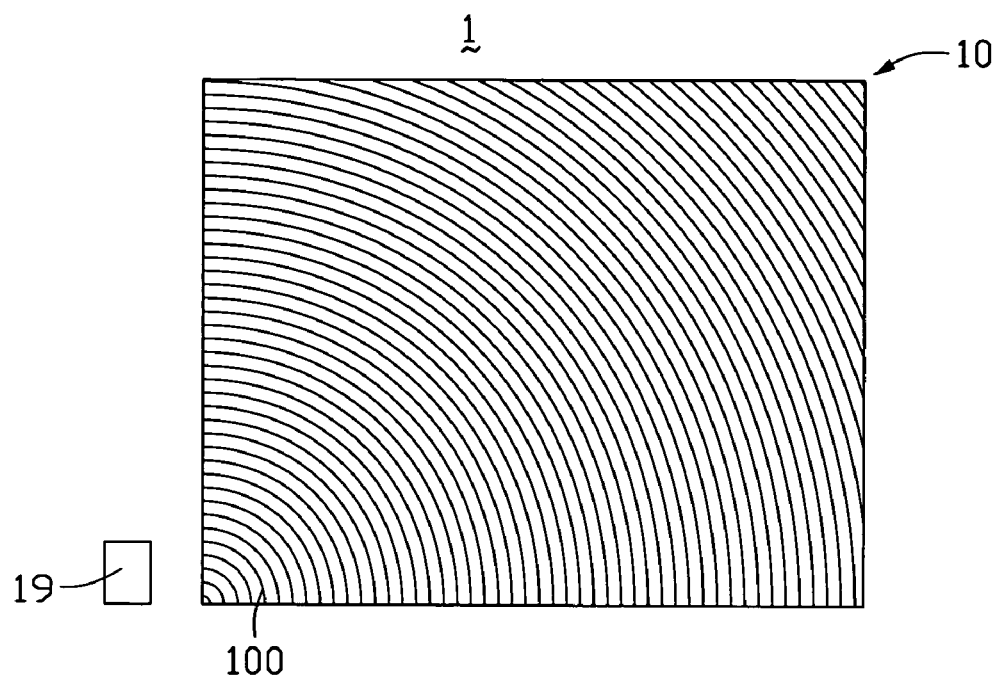
FIG. 4 is a schematic, bottom view of a backlight module using the light guide plate of FIG. 1.

FIG. 4 is a schematic, bottom view of a backlight module 1 using the light guide plate 10. The backlight module 1 also includes a point light source 19, which is located at a corner of the light guide plate 10 opposite one end of the incident surface 12. The light source 19 may be an LED (light emitting diode) or an OLED (organic light emitting diode). In the exemplary embodiment, the maximum luminance of the light guide plate 10 is controlled to be approximately at the center region of the emitting surface 13. Therefore the backlight module 1 does not need a prism sheet to collect light propagating in different directions. Thus, the number of components of the backlight module 1 can be reduced.

Figure 5:
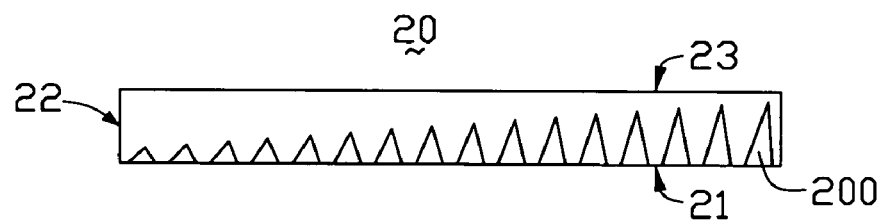
FIG. 5 is a schematic, simplified side view of a light guide plate according to a second embodiment of the present invention, showing ends of a plurality of V-shaped grooves thereof.
Figure 6:
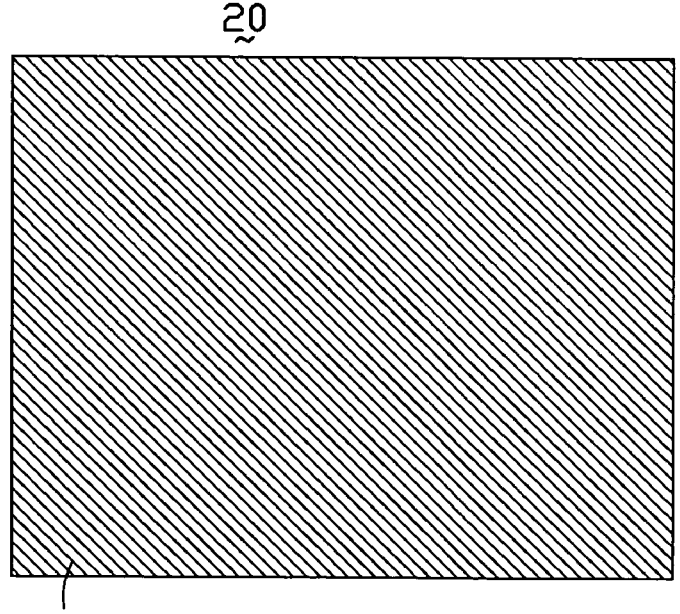
FIG. 6 is a bottom view of the light guide plate of FIG. 5, showing the V-shaped grooves being rectilinear.
Figure 7:
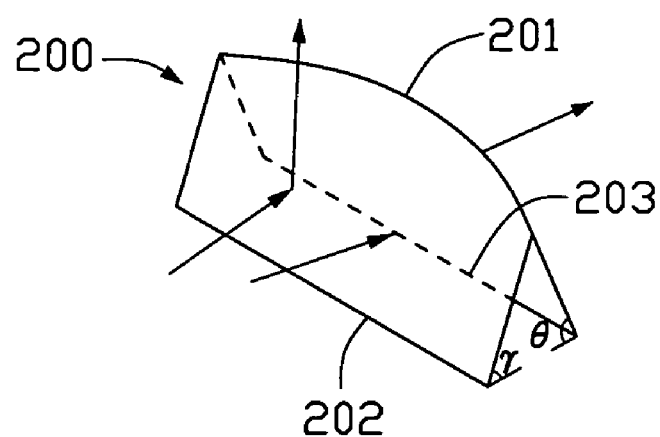
FIG. 7 is an enlarged, isometric view of part of one of the V-shaped grooves of the light guide plate of FIG. 5.

FIG. 5 is a schematic, side view of a light guide plate according to a second embodiment of the present invention. The light guide plate 20 includes a bottom surface 21, a light incident surface 22 connected to the bottom surface 21 at a corner portion of the light guide plate 20, and a light emitting surface 23 opposite to the bottom surface 21. Also referring to FIG. 6 and FIG. 7, a plurality of parallel V-shaped grooves 200 are spaced apart from each other a uniform distance. Heights of the V-shaped grooves 200 become progressively greater along a direction away from the incident surface 22. Each V-shaped groove 200 defines a top line 201, two bottom lines 202, 203 and two bottom angles γ, θ. The bottom lines 202 are parallel to each other. Preferably, the bottom angles γ, θ are different.

The top line 201 of each V-shaped groove 200 is gently arched. The arching of the top lines 201 of all the V-shaped grooves 200 has a same curvature. The bottom angle γ of each V-shaped groove 200 is configured such that most angles of light beams propagating from the incident surface 22 that reach the V-shaped groove 200 are incident at the interface of the V-shaped groove 200 at an angle that is larger than a critical angle. Such light beams are therefore totally internally reflected, and emit from the emitting surface 23 in a desired direction. In similar fashion, the bottom angle θ is configured such that most of internally reflected light beams that reach the V-shaped groove 200 are incident at the interface of the V-shaped groove 200 at an angle whereby they are totally internally reflected and then emit from the emitting surface 23 in a desired direction.

The top line 201 of each V-shaped groove 200 is configured so as to maximize the areas of the interfaces of the V-shaped groove 200, having regard to the top lines 201 of all the V-shaped grooves 200 also being configured to provide a desired distribution of intensity of light beams that emit from the emitting surface 23 in a desired direction. For example, the configurations of the top lines 201 can be such that a maximum luminance of the light guide plate 20 is at a center region of the emitting surface 23.

Figure 8:
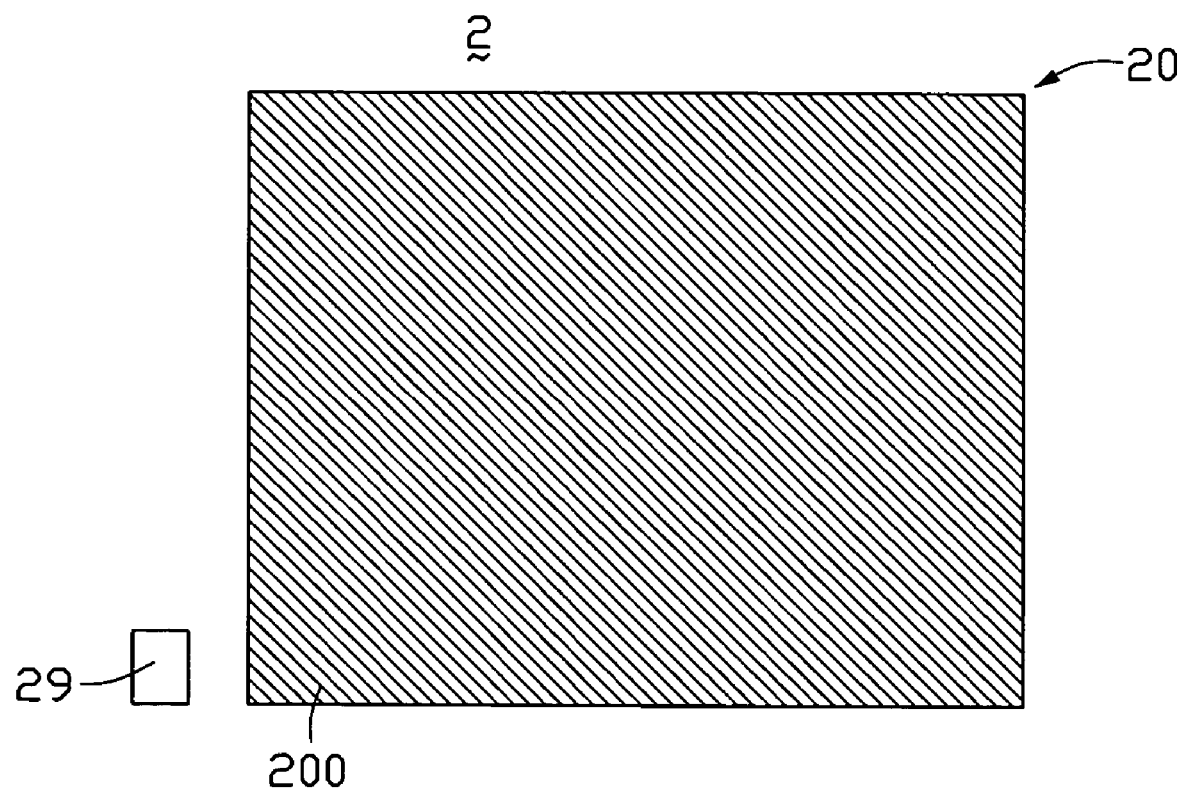
FIG. 8 is a schematic, bottom view of a backlight module using the light guide plate of FIG. 5.
Figure 9:
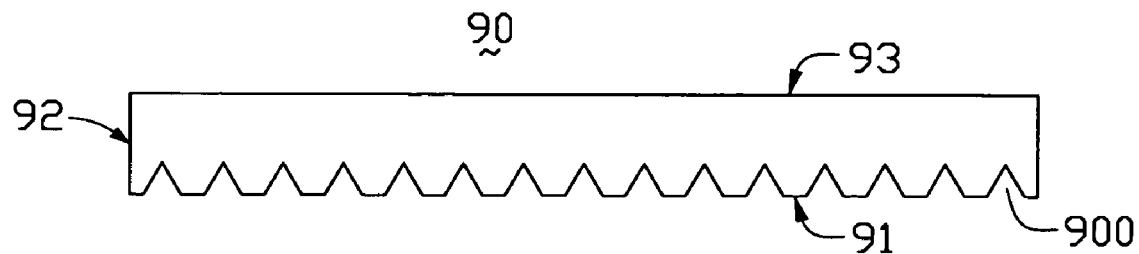
FIG. 9 is a schematic, simplified side view of a typical light guide plate.
Figure 10:
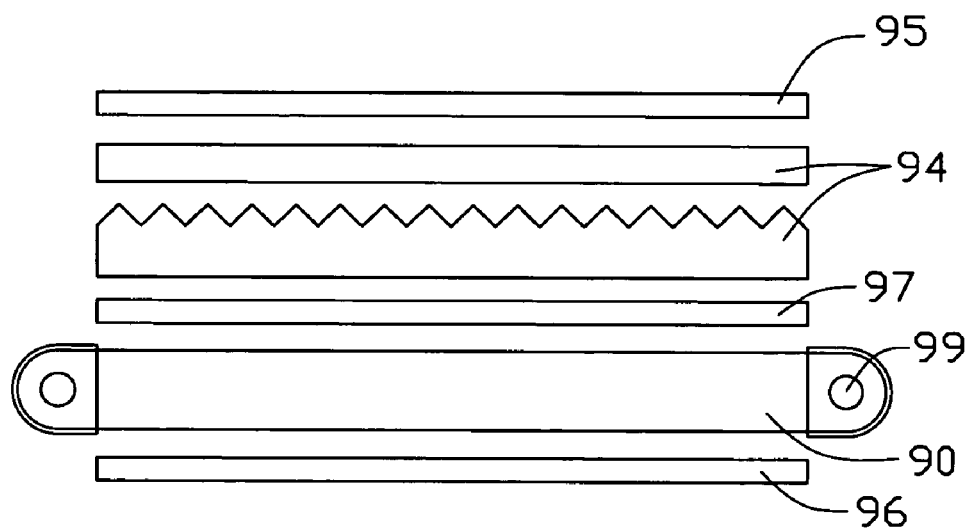
FIG. 10 is a schematic, exploded side view of a backlight module using the light guide plate of FIG. 9.

FIG. 8 is a schematic, bottom view of a backlight module using the light guide plate 20. The backlight module 2 also includes a point light source 29, which is located at a corner of the light guide plate 20 opposite one end of the incident surface 22. The light source 29 may be an LED or an OLED. In the exemplary embodiment, the maximum luminance of the light guide plate 20 is controlled to be approximately at the center region of the emitting surface 23. Therefore the backlight module 2 does not need a prism sheet to collect light propagating in different directions. Thus, the number of components of the backlight module 2 can be reduced.

In alternative embodiments, the bottom lines 102 of the V-shaped grooves 100 may have different curvatures. The interfaces of the V-shaped grooves 100, 200 can be coated with reflective material.

It is to be understood, however, that even though numerous characteristics and advantages of preferred embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A backlight module comprising:
   a light source; and
   a light guide plate comprising:
      a bottom surface;
      a light incident surface adjacent to the bottom surface;
      a light emitting surface opposite to the bottom surface; and
      a plurality of grooves formed in the light guide plate, a plurality of corresponding V-shaped configurations defined corresponding to said grooves, each of said V-shaped configurations including two bottom angles and a top line; wherein
   each top line is curved with therealong different heights in a vertical direction relative to the bottom surface.

2. The backlight module as claimed in claim 1, wherein heights of the V-shaped grooves become progressively greater along a direction away the incident surface.

3. The backlight module as claimed in claim 1, wherein the V-shaped grooves are arcuate and parallel to each other, and are concentric relative to a reference point located adjacent a corner of the light guide plate.

4. The backlight module as claimed in claim 1, wherein heights of the V-shaped grooves become progressively greater along a direction away from the incident surface.

5. The backlight module as claimed in claim 1, wherein the bottom lines of the V-shaped grooves have a same curvature.

6. The backlight module as claimed in claim 1, wherein the V-shaped grooves are rectilinear and parallel to each other, and are spaced apart from each other a uniform distance.

7. The backlight module as claimed in claim 1, wherein the bottom lines of the V-shaped grooves are parallel to each other.

8. A light guide plate comprising:
   a bottom surface;
   a light incident surface adjacent to the bottom surface;

a plurality of grooves formed in the light guide plate, a plurality of corresponding V-shaped configurations defined corresponding to said grooves, each of said V-shaped configurations including two bottom angles and a top line; wherein each top line is curved with therealong different heights in a vertical direction relative to the bottom surface.

9. The light guide plate as claimed in claim 8, wherein each of said V-shaped configuration is essentially defined by corresponding one of said groove.

10. The light guide plate as claimed in claim 8, wherein the top line of each of said V-shaped configurations is further bowed in the horizontal direction, and the top lines of all said V-shaped configurations are bowed toward a same center where alight source is located.

11. The light guide plate as claimed in claim 8, wherein said top line is bowed with a greatest height at a middle portion that any other portions thereof.

12. The light guide plate as claimed in claim 8, wherein heights of the V-shaped grooves become progressively greater along a direction away from the incident surface.

13. The light guide plate as claimed in claim 8, wherein the V-shaped grooves are arcuate and parallel to each other, and are concentric relative to a reference point located adjacent a corner of the light guide plate.

14. The light guide plate as claimed in claim 8, wherein heights of the V-shaped grooves become progressively greater along a direction away from the incident surface.

15. The light guide plate as claimed in claim 8, wherein the bottom lines of the V-shaped grooves have a same curvature.

16. The light guide plate as claimed in claim 8, wherein the V-shaped grooves are rectilinear and parallel to each other, and are spaced apart from each other a uniform distance.

17. The light guide plate as claimed in claim 8, wherein the bottom lines of the V-shaped grooves are parallel to each other.

* * * * *